United States Patent [19]

Harbolt et al.

[11] Patent Number: 4,962,283

[45] Date of Patent: Oct. 9, 1990

[54] SINGLE PASS CONTINUOUS UREA-SULFURIC ACID PROCESS

[75] Inventors: Bruce A. Harbolt, Hacienda Heights; Donald D. Moerdyke, Northridge, both of Calif.

[73] Assignee: Union Oil Company of California, Los Angeles, Calif.

[21] Appl. No.: 316,988

[22] Filed: Feb. 28, 1989

[51] Int. Cl.$^5$ .......................................... C07C 273/02
[52] U.S. Cl. .......................................... 564/63; 71/28; 71/29
[58] Field of Search ........................ 564/63; 71/28, 29

[56] References Cited

U.S. PATENT DOCUMENTS

| | | | |
|---|---|---|---|
| 1,511,875 | 10/1924 | Edgar | 71/29 |
| 4,011,300 | 3/1977 | Harbott et al. | 71/43 |
| 4,022,379 | 5/1977 | Ladisch | 239/8 |
| 4,116,664 | 9/1978 | Jones | 71/29 |
| 4,310,343 | 1/1982 | Verdegaal et al. | 71/28 |
| 4,315,763 | 2/1982 | Stoller et al. | 71/29 |
| 4,358,433 | 11/1982 | Pircon | 423/659 |
| 4,397,675 | 8/1983 | Young | 564/63 |
| 4,402,852 | 9/1983 | Young | 252/182 |
| 4,404,116 | 9/1983 | Young | 252/182 |
| 4,445,925 | 5/1984 | Young | 71/28 |
| 4,447,253 | 5/1984 | Young | 71/28 |
| 4,512,813 | 4/1985 | Young | 134/27 |
| 4,522,644 | 6/1985 | Young | 71/78 |
| 4,589,925 | 5/1986 | Young | 134/3 |
| 4,879,413 | 11/1989 | Buser et al. | 564/63 |

OTHER PUBLICATIONS

D. F. du Toit, Verslag Akad. Wetenschappen, 22, 573–574 (abstracted in Chemical Abstracts, 8, 2356, 1914).

L. H. Dalman, "Ternary Systems of Urea and Acids, I: Urea, Nitric Acid and Water, II: Urea, Sulfuric Acid and Water, III: Urea, Oxalic Acid and Water"; JACS, 56, 529–593 (1934).

Sulfur Institute Bulletin No. 10 (1964), "Adding Plant Nutrient Sulfur to Fertilizer".

Primary Examiner—Glennon H. Hollrah
Assistant Examiner—Susan P. Treaner
Attorney, Agent, or Firm—Gregory F. Wirzbicki; Michael A. Kondzella

[57] ABSTRACT

Urea and sulfuric acid are reacted in an air-water spray in cocurrent heat exchange therewith to produce concentrated urea-sulfuric acid solutions.

14 Claims, 1 Drawing Sheet

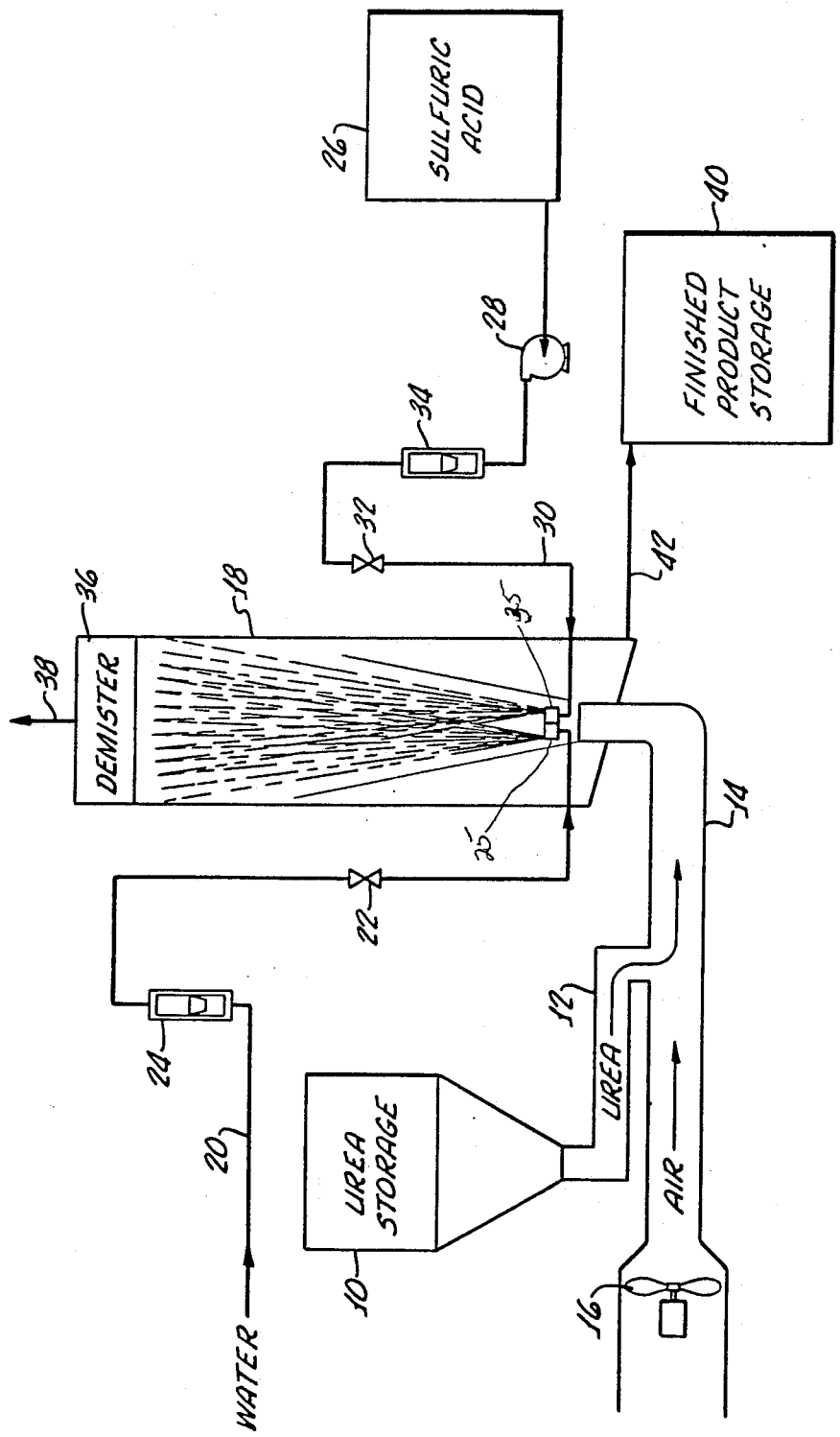

SINGLE PASS CONTINUOUS UREA-SULFURIC ACID PROCESS

FIELD OF THE INVENTION

This invention relates to the field of urea-sulfuric acid compositions and particularly to an improved process for producing stable, highly concentrated urea-sulfuric acid compositions which are useful in a variety of applications. The method permits consistently maintaining a predetermined product composition while avoiding potentially explosive autocatalytic decomposition associated with the highly exothermic reaction between urea and sulfuric acid.

BACKGROUND OF THE INVENTION

Urea is widely used as a topical, sub-surface and foliar fertilizer. Sulfuric acid has also been widely used in the agricultural industry and in other industries for numerous purposes. It is known to be highly corrosive both to metals and animal tissue, including human skin. In the agricultural industry, sulfuric acid has been used as a soil adjuvant, a water penetration improving agent, a herbicide for a wide variety of undesired vegetation, and as a selective herbicide on resistant crops such as onions and garlic.

Previous investigators have observed that urea, sulfuric acid and water can be reacted to form solutions containing mono- and diurea sulfates. This reaction is so exothermic, that it is difficult to control reaction temperature in large volume production plants.

D. F. du Toit found that urea formed certain compounds with oxalic, acetic, hydrochloric, nitric and sulfuric acids, and that the resulting compounds were stable in contact with their solutions at 20° C. Verslag Akad. Wetenschappen, 22, 573–4 (abstracted in Chemical Abstracts, 8, 2346, 1914).

L. H. Dalman expanded on du Toit's work by developing the phase relationships between the solid phase and saturated solutions at 10° C. (50° F.) and 25° C. (77° F.) but, as in the case of du Toit, did not develop or disclose methods capable of handling the high heat of reaction involved in large scale industrial processing. "Ternary Systems of Urea and Acids. I. Urea, Nitric Acid and Water. II. Urea, Sulfuric Acid and Water, III. Urea, Oxalic Acid and Water;" JACS 56, 549–53 (1934).

In the article "Adding Plant Nutrient Sulfur to Fertilizer," Sulfur Institute Bulletin No. 10 (1964), the addition of nutrient sulfur to fertilizers was discussed and it was mentioned that urea reacts with sulfuric acid to form two complexes of urea sulfate which are useful fertilizers.

In U.S. Pat. No. 4,116,664, L. R. Jones disclosed what is referred to therein as a tortuous, multistage process of producing combinations of urea and sulfuric acid in which portions of the sulfuric acid are incrementally added to and reacted with the total amount of urea to be reacted in each of several stages until the total amount of sulfuric acid has been reacted with the urea. The resulting product is unstable and requires further processing. Jones preferably adds water later as required to obtain stability and the desired composition. He discloses that the reaction can be carried out at temperatures of 100° to 225° F. and that if the sulfuric acid is added to the total amount of urea at a rate which is too fast, the temperature goes to about 200° to 225° F. and that a gas is emitted that causes changes in product characteristics such as solidification. The patent states that temperatures of 160° to 200° F. are preferred.

In U.S. Pat. No. 4,310,343, W. J. Verdegaal et al. disclosed a process for making a liquid fertilizer by reacting urea and sulfuric acid and using a heat sink of a "heel" of reaction product to dissipate the heat of reaction.

In U.S. Pat. No. 4,315,763, J. H. Stoller et al. disclosed the preparation of liquid fertilizers from a mixture of urea and phosphoric acids optionally containing the reaction product of urea and sulfuric acid. The patentees suggested that leaving a heel in the reaction vessel permitted further manufacture to be conducted in a stirred fluid mass.

In U.S. Pat. Nos. 4,397,675, 4,402,852, 4,404,116, 4,445,925, 4,447,253, 4,512,813, 4,522,644 and 4,589,925, D. C. Young disclosed processes for preparing urea-sulfuric acid compositions and various uses for such compositions. The processes generally utilized measured quantities of reactants selected to produce a product having a desired composition. The patentee controlled the temperature of reaction mainly by employing countercurrent direct air heat exchange, but suggested that heat dissipation and temperature control were facilitated by assuring that a heel or inventory of reaction product was present during the reaction.

SUMMARY OF THE INVENTION

In accordance with the present invention, solid particulate urea and sulfuric acid are caused to react in an air-water spray to produce a concentrated solution of urea and sulfuric acid. The water in the air-water spray provides the reaction medium as well as providing one of the ingredients of the product solution. The air in the air-water spray provides an entraining medium for the solid, particulate urea reactant and a cooling medium for the reaction between urea and sulfuric acid. Cooling by cocurrent heat exchange between the reacting urea, sulfuric acid and water and the air in the air-water spray is effective to control the reaction temperature to below the incipient decomposition temperature of the product urea-sulfuric acid solution. Unlike the prior art processes described above, the process of the present invention does not require the use of a heel of product as a heat sink, because sufficient cooling is achieved by direct contact between reactants and cooling medium.

BRIEF DESCRIPTION OF THE DRAWING

The sole FIGURE of the drawing is a schematic illustration of an apparatus and process flow system suitable for use in one embodiment of this invention.

DETAILED DESCRIPTION OF THE INVENTION

The present invention provides an improved process for producing a urea-sulfuric acid product of any desired composition. The process utilizes a unique single pass continuous blend method in which the reaction between urea and sulfuric acid is conducted simultaneously with cocurrent direct contact heat exchange between the reacting urea-sulfuric acid mixture and air in a water spray.

Referring to the drawing, urea from a urea storage tank 10 is fed into a conduit 12. Air is introduced into a conduit 14 connecting with conduit 12 by means of a blower 16 and entrains the urea entering conduit 14. Urea entrained in air is introduced into the bottom of a reactor 18 via conduit 14. Water is sprayed into reactor 18 via a conduit 20 equipped with a valve 22 and a metering device 24 and enters the bottom of reactor 18 in proximity to and, cocurrently with the urea stream through a spray nozzle 25. Sulfuric acid from a tank 26 is also sprayed into reactor 18 via a conduit 30 equipped with a pump 28, a valve 32 and a metering device 34 and enters the bottom of reactor 18 in proximity to and cocurrently with the urea stream and water spray through a spray nozzle 35. Reactor 18 contains a demister 36 and is equipped with a conduit 38, through which air exits to the atmosphere. Demister 36 can be any conventional demister, for example, one having a 2-3 inch thick polypropylene demister pad and a 4-6 inch thick stainless steel demister pad. Air removal may be facilitated by means of an inductor fan, not shown. Finished product is conveyed from reactor 18 to a storage tank 40 via a conduit 42.

It can be seen from the drawing that the air-entrained urea stream from conduit 14, the sulfuric acid spray from nozzle 35 and the water spray from nozzle 25 are in relatively close proximity to each other and, as particularly preferred, are injected into reactor 18 cocurrently in a parallel direction. In an especially preferred embodiment, not shown in the drawing, the three streams are concentric and their sources, located near the bottom of the reactor, vertically removed from one another. The water source is below the sulfuric acid source and the air-entrained urea source is below the water source.

An advantage of the present invention is that the reactants are cooled rapidly and consequently the residence time for the reactants at the reaction temperature is very short. Another advantage is that independent feeding of reactants into the reaction zone eliminates most of the exposure of process equipment to a corrosive medium. Thus total costs are lower than in a conventional process.

In general, the compositions prepared using the process of the present invention comprise about 5 to about 75 weight percent, preferably at least 10 to about 70 weight percent urea; about 5 to about 85 weight percent, preferably about 10 to about 80 weight percent sulfuric acid; and about 5 to about 35 weight percent, preferably about 10 to about 25 weight percent water. Urea and sulfuric acid, in combination, will usually comprise at least about 65 weight percent, generally at least about 75 weight percent, and preferably at least about 85 weight percent of the product solution.

Four digit product designations, e.g., 18-0-0-17, are conventionally used in the agricultural industry to designate the concentration of nitrogen, phosphorus (as $P_2O_5$), potassium (as $K_2$), and a fourth component - in this case sulfur expressed as the element. Thus, the composition 18-0-0-17 contains 18 weight percent nitrogen derived from urea and 17 weight percent sulfur derived from sulfuric acid. Using the atomic weights for nitrogen (14.01) and sulfur (32.07) and the molecular formulas and molecular weights for urea (60.06) and sulfuric acid (98.08), it can be readily determined that this formulation contains 38.58 weight percent urea and 51.99 weight percent sulfuric acid. By difference, the solution contains 9.43 weight percent water. The composition of all other products can be determined by the same procedure. Other products commonly used include 9-0-0-25, 10-0-0-19, 15-0-0-16, and 29-0-0-9.

The process of this invention can be used to produce any of the products mentioned above or any other product containing urea, sulfuric acid and water in any desired proportions. Urea is metered volumetrically, for example, by means of an auger feed. The quantities of sulfuric acid and water are controlled by metering devices such as turbine meters in their respective feed lines.

Urea can be used in any desired form such as prills, granules or as a powder. Use in the prilled or granular form is preferred because of the ease of handling. Sulfuric acid can be used in any convenient concentration from about 92 to about 98 weight percent $H_2SO_4$.

The reaction is usually run at temperatures of at least about 120° F., preferably below about 160° F. and most preferably at about 150° F. or lower. The lower temperatures, e.g. temperatures of about 150° F.-160° F. or lower, are particularly preferred where the product has a higher urea concentration, such as 29-0-0-9, because of the relatively low incipient decomposition temperatures of such products. Lower temperatures are generally preferred in the case of all products in order to minimize the formation of undesired byproducts of the reaction such as sulfamates.

In a typical process run, analogous to the process described hereinbefore with respect to the drawing, except that the source points for injection of air-entrained urea, water and sulfuric acid in the reactor were directed cocurrently and concentrically, the product 15-0-0-16, which is useful as a herbicide, is produced at the rate of 25 tons per hour in a 1,000 cu. ft. reactor. Granular urea entrained in air is fed into the reactor at a rate of 271 lb./min.; sulfuric acid (93% $H_2SO_4$) is sprayed into the reactor at the rate of 439 lb./min.; and water is sprayed into the reactor at a rate of 122.5 lb./min. The reaction temperature is 140° F.-146° F.

All of the references mentioned above, including the du Toit, Dalman and Sulfur Institute references and the patents to Jones, Verdegaal et al., Stoller et al. and Young are incorporated herein in their entireties by reference.

This invention may be embodied in other forms without departing from the spirit or essential characteristics thereof. For example, the apparatus and process of the present invention can be used to conduct other highly exothermic reactions in which it is necessary to mix a solid reactant with a liquid reactant and in which water can be present. It is also recognized that other types of process equipment than those specifically referred to herein can be used to produce the same or similar results. Consequently, the present embodiments are to be considered only as being illustrative and not restrictive, with the scope of the invention being indicated by the appended claims. All embodiments which come within the scope and equivalency of the claims are, therefore, intended to be embraced therein.

We claim:

1. A process for producing a concentrated solution of urea and sulfuric acid which comprises, in the absence of a heel of reaction product, continuously reacting solid particulate urea and sulfuric acid in an air-water spray.

2. A process for producing a concentrated solution of urea and sulfuric acid which comprises, in the absence of a heel of reaction product, introducing solid particulate urea entrained in air in a continuous stream into a reaction zone, simultaneously and independently introducing sulfuric acid in a continuous spray into said reaction zone, and simultaneously and independently introducing water into said reaction zone as a continuous spray, the quantity of air entraining said solid particulate urea being sufficient to control the temperature in said reaction zone to below the incipient decomposition temperature of the resulting urea-sulfuric acid solution; and continuously removing from said reaction zone and recovering a product comprising a concentrated urea-sulfuric acid solution.

3. A process according to claim 2 wherein the air-entrained urea stream, the sulfuric acid spray and the water spray are in relatively close proximity to one another, parallel and cocurrent.

4. A process according to claim 2 wherein the air-entrained urea stream, the sulfuric acid spray and the water spray are concentric.

5. A process according to claim 2 wherein said product comprises about 5 to about 75 weight percent urea, about 5 to about 85 weight percent sulfuric acid, and about 5 to about 35 weight percent water.

6. A process according to claim 2 wherein said product comprises about 10 to about 70 weight percent urea, about 10 to about 80 weight percent sulfuric acid and about 10 to about 25 weight percent water.

7. A process according to claim 2 wherein said product comprises at least about 65 weight percent urea and sulfuric acid in combination.

8. A process according to claim 2 wherein said product comprises at least about 75 weight percent urea and sulfuric acid in combination.

9. A process according to claim 2 wherein said product comprises at least about 85 weight percent urea and sulfuric acid in combination.

10. A process according to claim 2 wherein said product is a member selected from the group consisting of products having the designations 9-0-0-25, 10-0-0-19, 15-0-0-16, and 29-0-0-9.

11. A process according to claim 2 wherein the reaction temperature is in the range of about 120° F. to below about 160° F.

12. A process according to claim 2 wherein the reaction temperature is in the range of about 120° F. to about 150° F.

13. A process according to claim 2 wherein the reaction temperature is in the range of about 150° F. to about 160° F.

14. A process according to claim 2 wherein said reaction zone contains a demister.

* * * * *